(12) United States Patent
Rubinstein

(10) Patent No.: US 10,157,529 B2
(45) Date of Patent: Dec. 18, 2018

(54) DEVICE AND SYSTEM FOR ALERTING CAREGIVERS TO A CHILD ABANDONED IN A POTENTIALLY DANGEROUS ENVIRONMENT

(71) Applicant: Isaac Rubinstein, Haworth, NJ (US)

(72) Inventor: Isaac Rubinstein, Haworth, NJ (US)

(73) Assignee: SHARKK, LLC, Livingston, NJ (US)

(*) Notice: Subject to any disclaimer, the term of this patent is extended or adjusted under 35 U.S.C. 154(b) by 0 days.

(21) Appl. No.: 15/443,640

(22) Filed: Feb. 27, 2017

(65) Prior Publication Data

US 2018/0322758 A1 Nov. 8, 2018

(51) Int. Cl.
*G08B 21/02* (2006.01)

(52) U.S. Cl.
CPC ..... *G08B 21/0283* (2013.01); *G08B 21/0247* (2013.01); *G08B 21/0266* (2013.01); *G08B 21/0277* (2013.01)

(58) Field of Classification Search
CPC ............ G08B 21/0283; G08B 21/0247; G08B 21/0266; G08B 21/0277
See application file for complete search history.

(56) References Cited

U.S. PATENT DOCUMENTS

| | | | | |
|---|---|---|---|---|
| 9,139,128 B1* | 9/2015 | Lemons | .................... | B60Q 1/00 |
| 2005/0103111 A1* | 5/2005 | Imai | ...................... | G01L 9/0055 |
| | | | | 73/715 |
| 2007/0282988 A1* | 12/2007 | Bornhoevd | ............ | G06Q 10/00 |
| | | | | 709/223 |
| 2010/0298982 A1* | 11/2010 | Chamorro | .......... | H01R 13/6456 |
| | | | | 700/276 |
| 2014/0306838 A1* | 10/2014 | Beumler | ................... | B60N 2/28 |
| | | | | 340/988 |
| 2015/0009029 A1* | 1/2015 | Martin | .................. | A61B 5/7405 |
| | | | | 340/539.15 |
| 2016/0042631 A1* | 2/2016 | Ho | ...................... | G07C 9/00007 |
| | | | | 340/5.32 |
| 2016/0094954 A1* | 3/2016 | Millman | ............... | H04W 4/046 |
| | | | | 455/456.2 |
| 2016/0379459 A1* | 12/2016 | Trang | ................... | G08B 21/023 |
| | | | | 340/457 |

* cited by examiner

*Primary Examiner* — Erin F Heard
(74) *Attorney, Agent, or Firm* — Russ Weinzimmer & Associates, P.C.

(57) ABSTRACT

A child safety device and system is disclosed that alerts one or more authorized users when a caregiver walks away from a child in a car seat or similar location, when leaving a child alone is dangerous or otherwise undesirable, such as in a hot car. Detailed logging enables a review of all times that the caregiver was detected as moving too far from the child in a monitored location. The device includes at least one pressure sensor to detect the presence of a child in a location, a Bluetooth Low Energy beacon to provide a signal when energized, and a battery electrically connected to both the Bluetooth Low Energy beacon and the at least one pressure sensor, the Bluetooth Low Energy beacon being energized when pressure is applied to the pressure sensor, and the Bluetooth Low Energy beacon being deactivated when no pressure is applied to the pressure sensor.

8 Claims, 11 Drawing Sheets

DEVICE AND SYSTEM FOR ALERTING CAREGIVERS TO A CHILD ABANDONED IN A POTENTIALLY DANGEROUS ENVIRONMENT

FIELD OF INVENTION

This invention relates generally to child safety devices, and more particularly to child safety devices that monitor a separation distance between a child and a caregiver's mobile device, such as a smartphone.

BACKGROUND OF THE INVENTION

Many fatalities and injuries of children have occurred because a parent or other caregiver left a child alone in a potentially or clearly harmful situation. Children are sometimes left alone in cars or other potentially dangerous locations by absent-minded, forgetful, ignorant, or careless parents or caregivers. For example, if the weather is hot, and the car has its windows rolled up because the air conditioning was on, and a child is left in the car sitting in a car seat, then the child's cries could be difficult to hear by the parent or other caregiver while walking away from the car. If the parent or other caregiver is distracted or absentminded, the child can suffer great physical and/or emotional harm by being left behind in an increasingly hot car. Many small children die each year because of being left behind in a hot car.

There is presently no adequate system to alert caregivers, such as parents, guardians, supervisors, and/or other authorized parties as to when a child has been left in a car seat while the caregiver is walking away, before harm can occur.

Also, there is presently no adequate system to alert parents that a caregiver, such as a babysitter, a mother's helper, or an older sibling, has walked too far away from a baby in a bathtub, or has left a baby alone in a playpen for a dangerously extended period of time.

SUMMARY OF THE INVENTION

Under certain circumstances, it may be acceptable to leave a baby alone for a short period of time in locations such as a crib or a playpen, but leaving a baby alone and unmonitored for a long time is risky, and can be dangerous.

The invention alerts one or more caregivers to the potential danger of leaving a baby alone in locations such as in a baby safety seat in a car, or in a baby bath tub, etc.

A baby can be left alone by mistake by a well-meaning caregiver, or can be intentionally left alone by a reckless caregiver. In either case, the system of the invention will alert the caregiver, as well as additional authorized users. If a baby is left alone by mistake, an alert on the caregiver's smartphone will remind him or her to not leave the baby alone. Additionally, one or more other caregivers, such as a parent or guardian can be notified by the invention, even if they are not in immediate geographical proximity, thereby providing beneficial remote monitoring, which is useful to detect, monitor and discourage unscrupulous caregivers.

The invention detects the presence of a child in a potentially dangerous location, such as in a car seat, and displays an alert on the caregiver's smartphone if the caregiver's smartphone moves away from the car, leaving the child behind. The system can also alert other caregivers, such as caregivers or parents that are not within geographical proximity of the event.

The system provides positive indications to the primary caregiver, and optionally to other remote caregivers, that a child's presence in the car seat is detected, that the monitoring system is active, and that the remote alert system is enabled and functional.

The present invention monitors the distance of separation between a child's location and a caregiver's location, and alerts multiple other interested parties, such as parents, grandparents, etc., when the distance of separation increases enough to warrant attention, or when a connection between a caregiver's smartphone and the safety device is lost due to distance, or due to Bluetooth communications being disabled on the smartphone.

The present invention also logs the physical presence of a caregiver's mobile device in a monitored location, and alerts caregivers, parents, guardians, supervisors and/or other authorized parties when a child is potentially left alone in a monitored location. While a caregiver is able to leave the mobile device next to the child and walk away without the mobile device, prompting the caregiver to click, touch, or move the mobile device can address that by initiating both a local and a remote alert if the caregiver's response is delayed.

Although the device of the invention can advantageously be used for protecting a child in a car seat, such a device can also be used in conjunction with any other child-related equipment where a baby can possibly be left alone, including a stroller, a crib, a playpen, a cot, a travel bed, a bassinet, or a cradle, for example.

A water resistant embodiment can be used in a bathtub.

The device can be used to monitor and log physical proximity at all times between a caregiver's smartphone and a baby in child-related equipment, such as a child seat, a crib, a stroller, or a bathtub, for example.

A caregiver can log an occasional visit by clicking "I am here" in a smartphone app. This will cause current time and caregiver's device ID to be logged, and a detailed notification will be sent to all subscribed and authorized parties accordingly.

A general aspect of the invention is a device for alerting caregivers of a child that the child has been unintentionally or recklessly abandoned, with the intention of preventing harm to the child. The device includes: at least one pressure sensor configured to detect the presence of a child in a location, the pressure sensor functioning as an open switch when no detectable pressure is applied to the pressure sensor; a Bluetooth Low Energy beacon configured to provide a signal when energized; and a battery electrically connected to both the Bluetooth Low Energy beacon and the at least one pressure sensor, thereby energizing the Bluetooth Low Energy beacon when detectable pressure is applied to the pressure sensor, and deactivating the Bluetooth Low Energy beacon when no detectable pressure is applied to the pressure sensor.

In some embodiments, the at least one pressure sensor is connected to the Bluetooth Low Energy beacon via a flexible wire so that the pressure sensing element can be placed separately from the Bluetooth Low Energy beacon.

In some embodiments, the at least one pressure sensor includes a plurality of pressure sensors connected in parallel. In further embodiments, at least one pressure sensor is a cushion pressure sensing element configured for large area sensing, and wherein at least one pressure sensor is a strip pressure sensing element configured for small or narrow area sensing.

In some embodiments, the at least one pressure sensor is a cushion pressure sensing element configured for large area sensing and for being inserted under a cushion of a seat.

In some embodiments, the at least one pressure sensor is a cushion pressure sensing element configured for large area sensing and for being placed on a cushion of a seat.

In some embodiments, the signal provided by the Bluetooth Low Energy beacon is interpreted by a smartphone or tablet computer, and local alerts are generated based on a signal strength of the signal being lower than a threshold. In further embodiments, the local alerts received and displayed are communicated via an internet connection by the at least one smart phone or tablet computer to a central server that communicates the local alerts to a plurality of devices via respective individual internet connections.

In some embodiments, the local and or remote alerts include: time, proximity, location, and device ID.

Another general aspect of the invention is a system for alerting a caregiver of a child that the child has been unintentionally or recklessly abandoned, with the intention of preventing harm to the child. The system includes: a child presence detecting device that transmits a signal using a Bluetooth Low Energy beacon only when a child is present in a location; and a local mobile device configured to receive and interpret the signal provided by the Bluetooth Low Energy beacon, and configured to generate a local alert when a signal strength of the signal becomes lower than a threshold, the local alert being for alerting a caregiver carrying the mobile device that the child has been unintentionally or recklessly abandoned.

In some embodiments, the local alert includes: time, proximity, location, and device ID.

In some embodiments, the system further includes a central server, and the local mobile device is configured to send the local alert via an internet connection to the central server, and the central server is configured to communicate the local alert to at least one remote mobile device via a respective individual internet connection.

In some embodiments, multiple local mobile devices continuously monitor their own distance to a child presence detecting device, each using an individual Internet connection to relay local alerts via the central server that communicates with at least one remote mobile device via a respective individual internet connection.

In some embodiments, the system also includes: a second local mobile device configured to interpret the signal provided by the Bluetooth Low Energy beacon, and configured to generate a second local alert when a signal strength of the signal becomes lower than a threshold, the second local alert being for alerting at least a second caregiver carrying the second mobile device that the child has been unintentionally or recklessly abandoned.

In some embodiments, the local mobile device is configured to receive and interpret a plurality of signals provided by a respective plurality of Bluetooth Low Energy beacons, and is configured to generate a local alert whenever a signal strength of one of the signals becomes lower than a threshold.

In some embodiments, the system further includes a second server, and the local mobile device is configured to send the local alert via an internet connection to both the central server and the second server, the central server is configured to communicate the local alert to at least one remote mobile device via a respective individual internet connection, and the second server is configured to communicate the local alert to at least one additional remote mobile device via a respective individual internet connection.

In some embodiments, the mobile device is one of: a smart phone, a tablet computer, a notebook computer, a laptop computer.

In some embodiments, the child separation monitoring device includes: at least one pressure sensor configured to detect the presence of a child in a location, the pressure sensor functioning as an open switch when no detectable pressure is applied to the pressure sensor; a Bluetooth Low Energy beacon configured to provide the signal when energized; and a battery electrically connected to both the Bluetooth Low Energy beacon and the at least one pressure sensor, thereby energizing the Bluetooth Low Energy beacon when detectable pressure is applied to the pressure sensor, and deactivating the Bluetooth Low Energy beacon when no detectable pressure is applied to the pressure sensor.

In some embodiments, the local mobile device that is configured to receive and interpret the signal provided by the Bluetooth Low Energy beacon is also configured to generate a remote alert, the central server being configured to communicate the local alert to at least one remote mobile device via a respective individual internet connection, a remote alert being generated when any of the following events occur: a child has been placed or strapped into a monitored location having a child presence detecting device; the distance between a mobile device and a child presence detecting device has exceeded a preset threshold distance; a mobile device has lost communication with a previously detected child presence detecting device due to physically moving away from the child presence detecting device; child presence is no longer detected by the child presence detecting device, indicating that either the child presence detecting device has malfunctioned, or the child was taken out of a monitored location having a child presence detecting device.

In some embodiments, the central server is configured to: periodically ping each mobile device that is in local relationship with a child presence detecting device that is actively sensing a child; and send a remote alert to at least one remote mobile device whenever a child presence detecting device is turned off while monitoring a child.

In some embodiments, the mobile device is configured to: detect when a mobile device monitoring a child has been placed near the child presence detecting device activated by a child, and the mobile device has not moved for longer than a preset time period, and the caregiver has not responded to prompts on the mobile device; and consequently send a remote alert indicating that the caregiver has moved away from both the child and the mobile device.

BRIEF DESCRIPTION OF THE DRAWINGS

The invention will be more fully understood from the following detailed description, in conjunction with the following figures, wherein:

FIG. 1 is a perspective view of a typical child car seat, where a child is usually strapped in.

DETAILED DESCRIPTION

Figure 1:
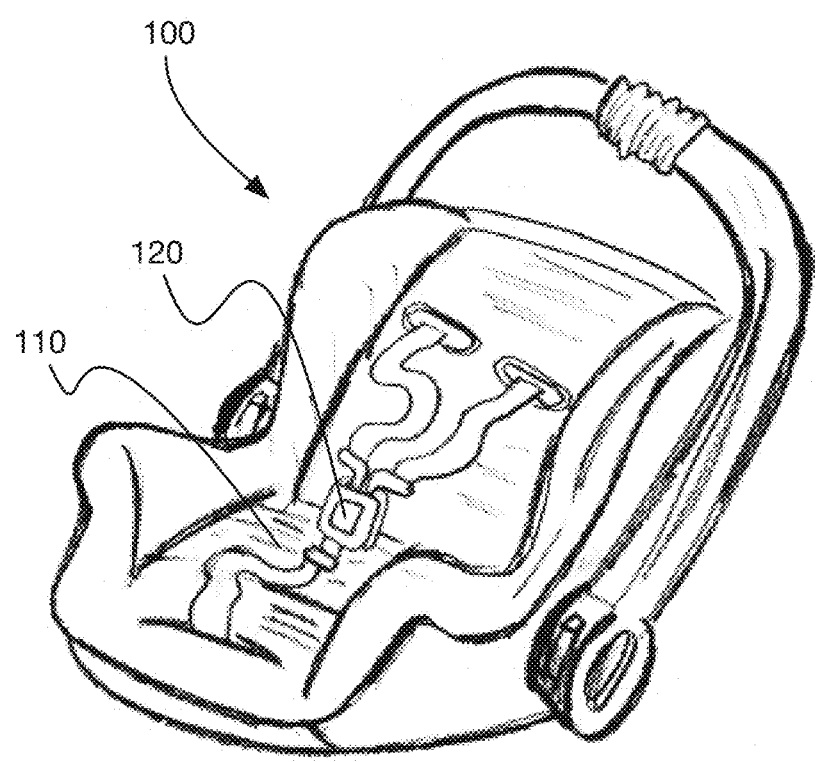

FIG. 1 shows a typical child car seat 100 with a padded sitting area 110 and a buckle with straps 120 that keep the baby in the seat, and prevent any significant shift in position in the seat 100. This typical child car seat 100 also represents other places where a child could be strapped in, such as a baby chair or a stroller. The invention can also be used where a child is not strapped in, but is confined to a controlled area, such as in a play pen, a crib, or a baby bath tub, for example.

Figure 2:
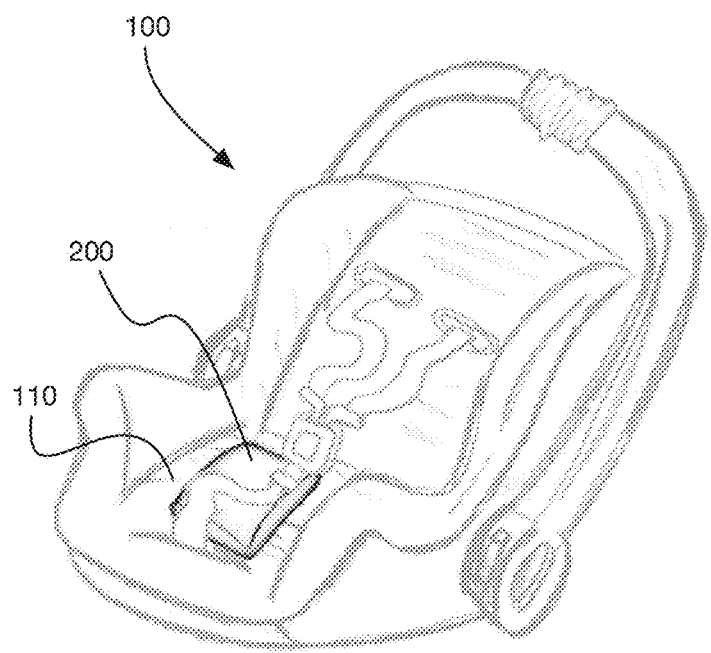
FIG. 2A is a greyed perspective view of the child car seat of FIG. 1, also including a pressure sensor located on the cushion, such that the sensor rests between the child and the cushion when the child is sits on the child car seat.
FIG. 2B is a greyed perspective view of the child car seat of FIG. 1, also including a pressure sensor hidden underneath the cushion of the child car seat of FIG. 1, such that the sensor rests under the cushion of the car seat when the child sits on the child car seat.
Figure 2:
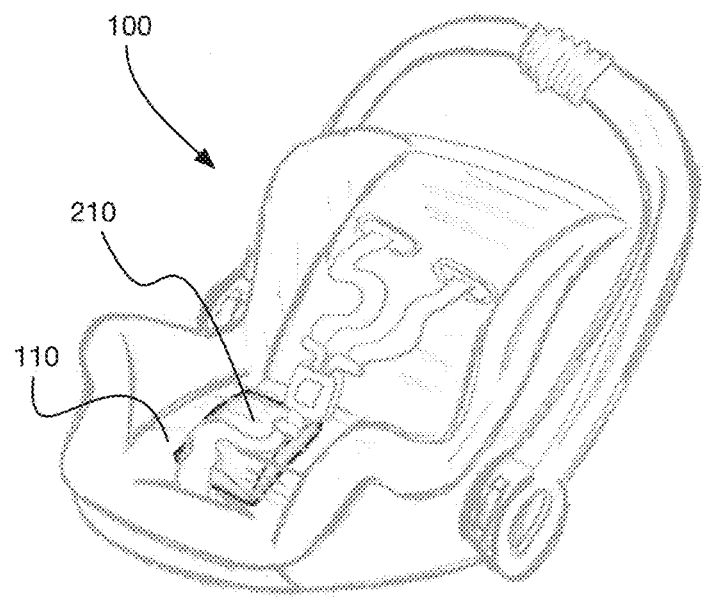

FIG. 2A shows a pressure sensor 200 placed on top of the padded sitting area 110 of the sample child seat 100. When strapped in, the baby is seated on top of the sensor, which is adapted to be pleasant to touch, is sealed against natural spills, and is robust against repeated physical abuse by curious babies and careless adults.

FIG. 2B shows a pressure sensor 210 placed underneath the padded child sitting area 110. The pressure sensor 210 needs to be more sensitive than the pressure sensor 200 to compensate for the pressure damping effect of the padding 110. As an alternative, pressure sensor 200 and pressure sensor 210 could be the same sensor with different sensitivity settings.

Figure 3:
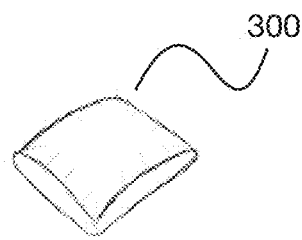
FIG. 3A is a perspective view of a cushion pressure sensing element.
FIG. 3B is a perspective view of a strip pressure sensing element.
FIG. 3C is a perspective view of an exemplary pressure sensor that includes one cushion pressure sensing element of FIG. 3A, and two strip pressure sensing elements of FIG. 3B, electrically connected in parallel.
Figure 3:
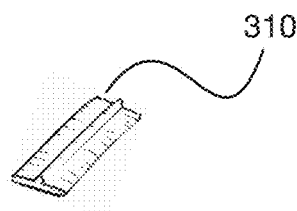
Figure 3:
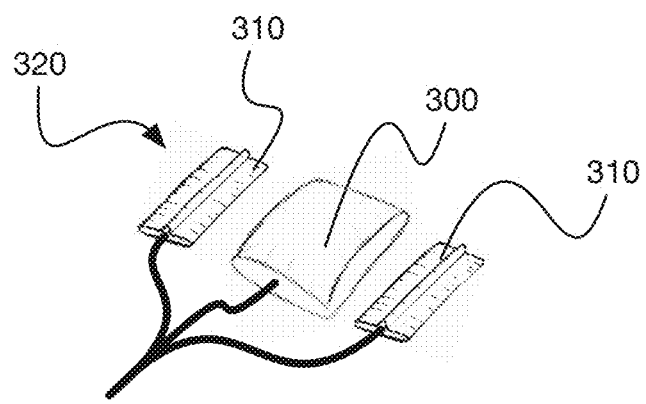

FIGS. 3A-3C show three sample pressure sensors, each suitable for different situations.

FIG. 3A shows a cushion pressure sensing element 300. Cushion pressure sensing elements are suitable for applications where an area coverage is required, such as on top of a padded sitting area 110 in FIG. 2A. Cushion sensors can also be suitable for large area sensing where the position of a child is not fixed, such as in a playpen or a crib or a large baby carriage.

FIG. 3B shows a strip pressure sensing element 310. Strip pressure sensing elements are suitable where the position of a baby is fixed, such as in a baby car seat where a baby is strapped in.

FIG. 3C shows a sample pressure sensor 320 that includes one cushion pressure sensing element 300 and two strip pressure sensing elements 310, all electrically connected in parallel. Due to the parallel connection, activating one or any combination of any number of individual pressure sensing elements is functionally equivalent. Pressure sensors with multiple parallel pressure sensing elements are suitable where either a large sitting area needs to be covered, or the baby can be seated in multiple locations.

Figure 4:
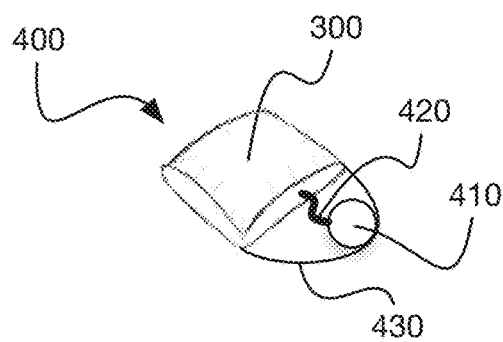
FIG. 4A is a schematic diagram of a cushion pressure sensing element electrically connected to a mechanically attached Blue Tooth Low Energy (BTLE) beacon.
FIG. 4B is a schematic diagram of a strip pressure sensing element with a BTLE beacon electrically connected using a wire that also serves as a mechanically flexible structural element.
FIG. 4C is a schematic diagram of a pressure sensor including a plurality of pressure sensing elements, electrically connected in parallel to a BTLE beacon.
Figure 4:
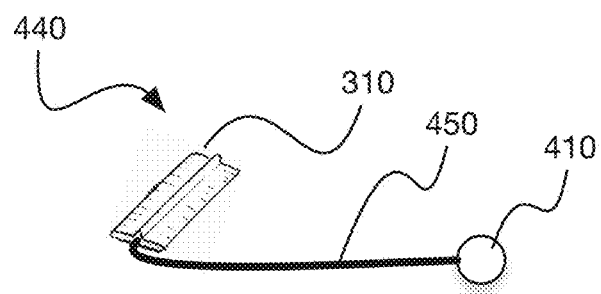
Figure 4:
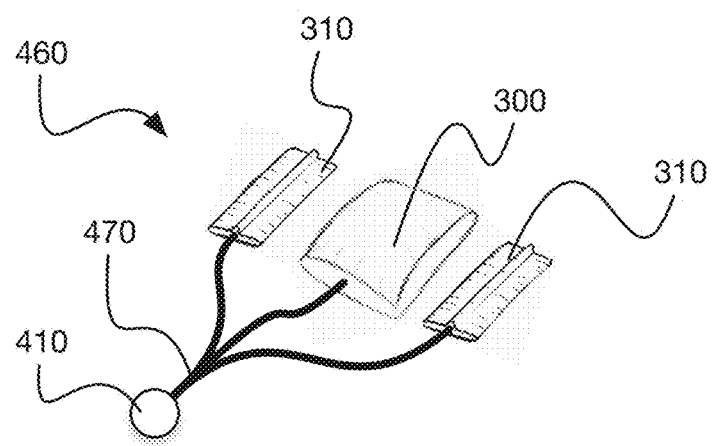

FIG. 4A shows sample rigid safety device 400 including a cushion pressure sensing element 300, electrically connected via wire 420 to a Bluetooth Low Energy beacon 410, both the cushion pressure sensing element 300 and the beacon 410 held together as an integrated physical unit by a brace 430. In one preferred embodiment, the brace 430 is the actual back wall of the cushion pressure sensing element 300.

Bluetooth Low Energy beacons are hardware transmitters—a class of Bluetooth low energy (LE) devices that broadcast their identifier to nearby portable electronic devices, such as a smart phone or a tablet computer. The technology enables smartphones, tablets, and other devices to perform actions when in close proximity to a beacon.

Bluetooth beacons use Bluetooth low energy proximity sensing to transmit a universally unique identifier picked up by a compatible app or operating system running on a smartphone, for example. The identifier and several bytes sent with it can be used to estimate the distance between a Beacon 410 and a receiving device, such a smartphone. The smartphone can be utilized to assess its physical location, track beacons, or trigger a location-based action on the smartphone.

Bluetooth beacons differ from some other location-based technologies in that the broadcasting device (beacon) is only a one-way transmitter to the receiving smartphone or receiving device, and necessitates a specific app installed on the receiving device to interact with the beacons.

This one-way communication allows a Bluetooth device to transmit information, but not listen for it. These one-way "beacons" do not require a paired connection like conventional Bluetooth devices, but are rather identified by means of a vendor specific code. Each beacon can also be configured to transmit a small amount of digital information, so the beacons have new useful applications, such as in the present invention.

Bluetooth LE beacon transmitters come in a variety of form factors, including small coin cell devices, USB sticks, and generic Bluetooth 4.0 capable USB dongles.

FIG. 4B shows a sample flexible safety device 440 including a strip pressure sensing element 310, electrically connected to standard Bluetooth Low Energy beacon 410 via a flexible wire 450. Such configuration is convenient where the pressure sensing element 310 needs to be tucked away separately from the beacon 410.

FIG. 4C shows a sample flexible safety device 460 including a pressure sensor that includes multiple pressure sensing elements 310, 300, and 310, electrically connected in parallel 470 to a beacon 410. A sample location where such a pressure sensor could be used is in a baby stroller.

Cushion sensor 300 can be positioned under a baby mattress, in the middle of the stroller. The two strip pressure sensing elements 310 would be positioned under the baby mattress to the sides of the cushion sensing element 300, so as to detect a baby that rolls on its side.

Figure 5:
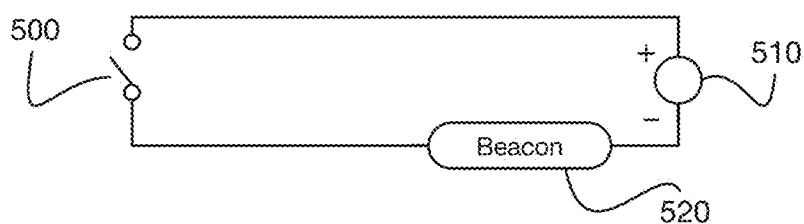
FIG. 5A is a schematic diagram showing a power source (e.g., a battery) connected to a standard BTLE beacon via a normally open pressure switch.
FIG. 5B is a schematic diagram showing the power source connected to a BTLE beacon via a normally open pressure switch, via a conventional ground leakage detection circuit.
Figure 5:
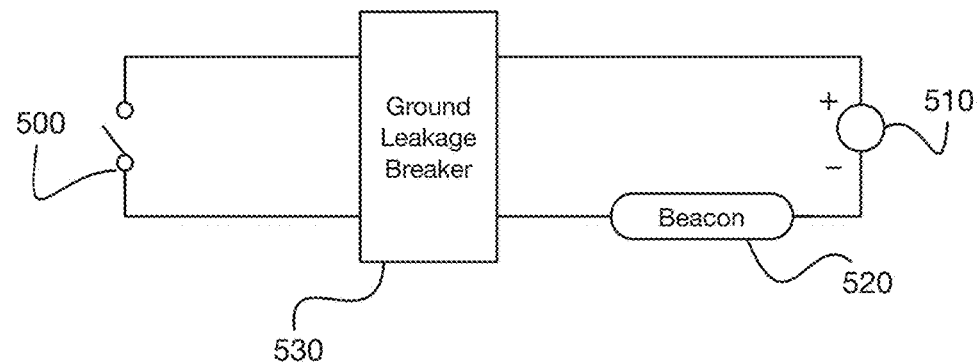

FIG. 5A shows a basic schematic diagram where the power source, such as a battery 510, is connected to a standard Bluetooth Low Energy beacon 520 via a normally open pressure switch 500, thereby deactivating the beacon 520 when no pressure is detected by pressure sensor 500. Deactivating the beacon 520 when no pressure is sensed serves a dual purpose. Disconnecting the energy source 510 whenever a child is not detected significantly prolongs battery life. Also, disconnecting the battery 510 shuts off the beacon 520 thus signaling the monitoring device, to be described below, that a child is either not present in the seat or is not being detected due to improper positioning or system failure.

FIG. 5B shows a basic electric diagram where the power source 510 is connected to a beacon 520 via a normally open pressure switch 500, via a conventional ground leakage breaker circuit 530. Such additional ground leakage detection makes the device more appropriate for use in moist or humid conditions such as outdoors or in a bathtub, where the power source 510 should be disconnected as soon as current leakage is detected.

Figure 6:
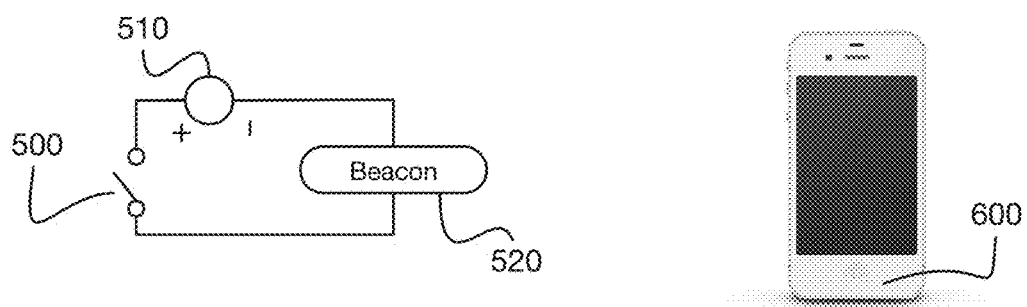
FIG. 6 is a diagram showing a single smartphone continuously monitoring the distance to a beacon as in FIG. 5A.

FIG. 6 shows a system wherein a single smartphone device 600 continuously monitors the distance to a beacon 520, and displays a combination of alerts and notifications (explained below) on the smartphone when baby presence is sensed by pressure sensor 500, or when the distance between the smartphone and the beacon exceeds a preset threshold while a baby presence is sensed by the pressure sensor 500. Currently smartphones are able to display visual, audible, and vibration alerts, in addition to relaying such alerts to wearable devices, such as a smart-watch. Naturally, notification modes will change as smartphones evolve their notification capabilities.

A caretaker receives a positive indication on his mobile device or smartphone 600 whenever a baby's presence is detected by pressure sensor 500, and beacon 520 is within an acceptable range. This provides positive verification that the system is indeed working, and baby presence is indeed being detected. Conversely, if the beacon 520 is NOT within an acceptable range, such as when a caretaker leaves a baby in a car seat that incorporates the device of the invention, the smart phone carried by the caretaker will alert the caretaker that an unacceptable distance has been traversed without the child. This then reminds the caretaker that he/she should bring the baby with him/her, or abandon the excursion and return to the baby. Any number of devices 600 can simultaneously monitor distance to beacon 520, such as the cell phones of both a mother and a father, each of whom assumed that the other parent was minding the child.

Figure 7:
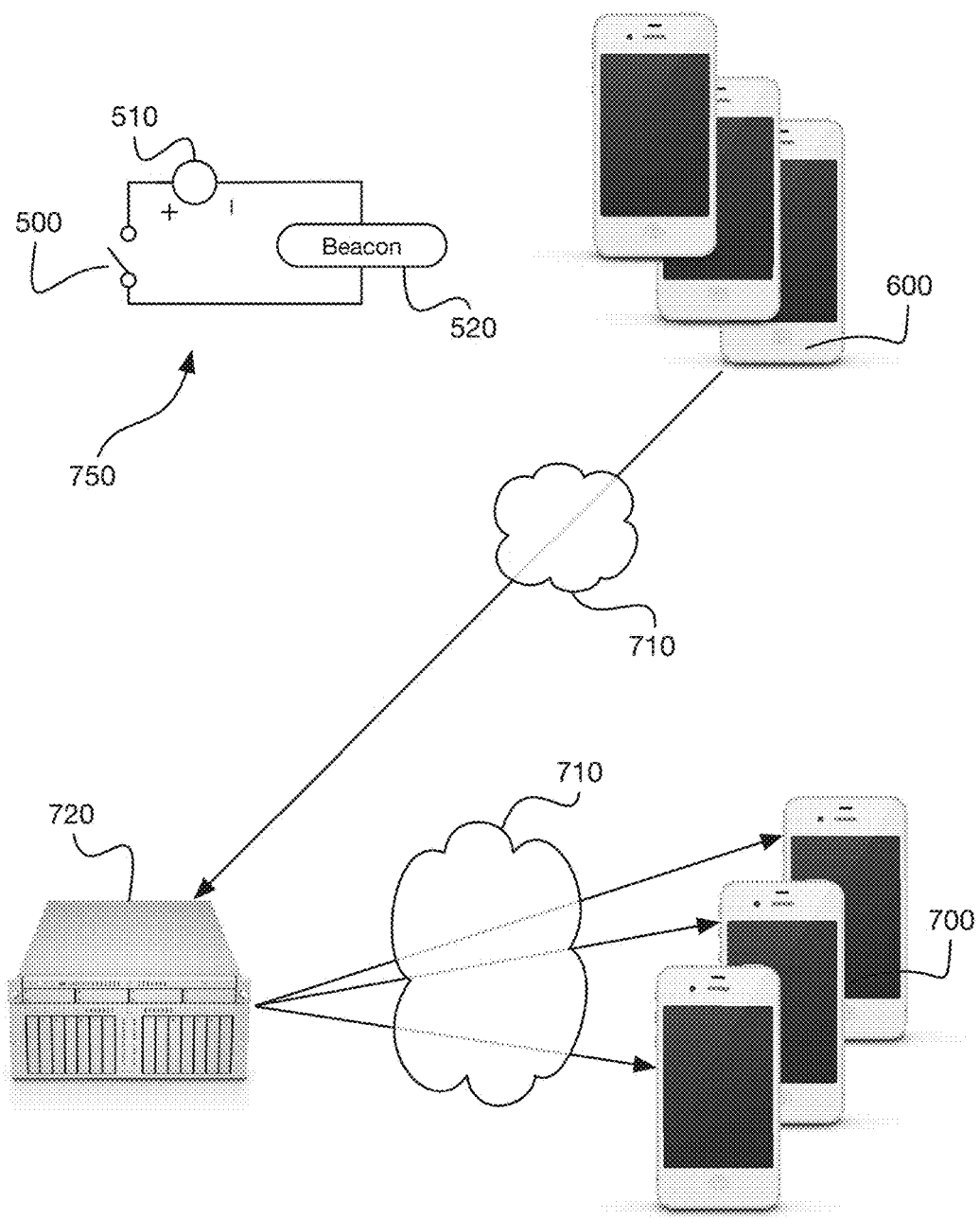
FIG. 7 is a diagram showing a system wherein multiple smartphones continuously monitor their own distance to the safety device that contains a beacon, while utilizing a central server to relay alerts to a multitude of Internet connected devices and services.

FIG. 7 shows a system wherein multiple smartphones 600 continuously monitor their own distance to a beacon 520, each using an individual Internet connection 710 to relay alerts via a central server 720 that communicates with a plurality of devices 700 via respective individual internet connections 710. A smartphone 600 can track and monitor multiple beacons 520 simultaneously, and trigger alerts on a multitude of devices 700, even via a multitude of servers 720.

Remote monitoring devices 700 can be notified when any of the following occurs:
a) A child is placed and strapped into a monitored location
b) The distance between any tracking device 600 and a beacon 520 exceeds a preset threshold distance.
c) A tracking device 600 loses connection to a previously detected beacon 520, while physically moving away from the beacon 520.
d) Child presence is no longer detected by the pressure sensor, indicating that either child presence sensing is malfunctioning, or the child was taken out of a monitored location.

A smartphone assesses its distance to a Bluetooth Low Energy beacon by interpreting the strength of the radio frequency signal emitted by the Bluetooth Low Energy beacon. Such conversion of radio frequency signal strength to actual distance is not very accurate, and can only provide an approximation of the actual distance. It is common practice to refrain from referring to actual distance to a Bluetooth Low Energy beacon in quantitative terms such as inches, feet, meters, yards etc., and to prefer more qualitative terms such as "immediate", "near", and "far". For example, as a caregiver moves away from a device 200, while baby presence is sensed by the pressure sensor 500, the distance to the beacon 520 as sensed by the caregiver's smartphone 600 will change from "immediate" to "near", then to "far", and eventually the beacon 520 will no longer be sensed by the caregiver's smartphone 600.

There is no direct way to distinguish between a smartphone 600 that moved away from a beacon 520, a smartphone 600 that was turned off, and a smartphone 600 that disabled its Bluetooth functionality. We distinguish between those states indirectly, in software.

Our software running on the smartphone 600 monitors Bluetooth availability, and will alert to the server 720, that will in turn alert all other authorized users 700, if a caregiver disables Bluetooth functionality while being in any proximity to a monitored baby.

Our server 720 software periodically pings each smartphone 600 that is in proximity to a baby device 750 that is actively sensing a baby. An alert will be issued whenever a device 750 is turned off while monitoring a baby.

We consider a device 600 as moving too far from a monitored location if a beacon 520 is no longer available after being "far". This is in contrast to a beacon 520 disappearing while being "immediate" or "near", as this may mean that a baby was simply taken out and is no longer sensed by the pressure sensor 500.

Additional logic can be applied to better manage alerts. For example, there is no need to issue an alert when a smartphone 600 moves away from a monitored baby while another authorized smartphone 600 is in immediate vicinity of the baby. This represents one caregiver moving away while another is still watching the baby.

Another use of smartphone capabilities is an attempt to detect a smartphone 600 left near a baby while a caregiver moves away. Some smartphones allow us to always monitor their GPS and accelerometers to determine if the smartphone 600 is moving or how long since it last moved. If a smartphone 600 that is actively monitoring a baby is not moving for longer than a preset time period, the caregiver will be prompted to touch a button on the smartphone 600, or an alert will be issued from the smartphone 600.

Remote monitoring of the child presence-related events above requires authorization by a child's parent or other care giver. Such authorizations can be managed via software running on server 720.

Mobile devices 600 and beacons 520 can be associated with a friendly name when accessed via software running on server 720.

All events sent to the server are logged for future reference and pattern analysis that can be performed asynchronously, not necessarily as they happen in real time. Saved logs can be remotely accessed by users. The length of time the logs will be kept depends on server storage availability and consumer willingness to pay a fee. There may also be an option to receive any log via email, before such log is deleted.

Figure 8:
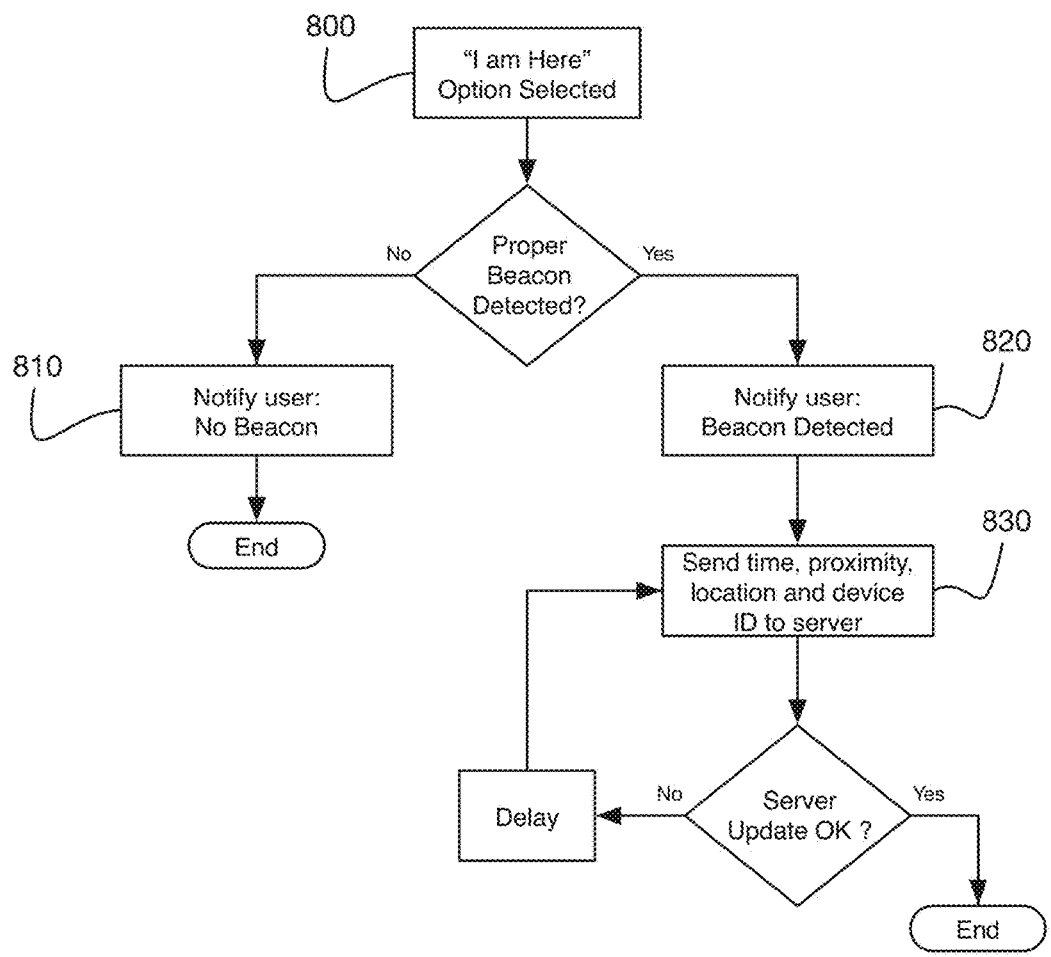
FIG. 8 is a process flowchart showing protocol contingent on detection status of a proper beacon signal.

FIG. 8 is a process flowchart showing a protocol contingent on detection status of a proper beacon signal, and logging user location and related data on a server, the process implemented in a smartphone app running on a smartphone. This is useful when a parent or guardian wants to make sure a caregiver is indeed in the proximity of a child at a given moment or in certain time intervals.

Referring to FIG. 8 in detail, when a caregiver actuates the "I AM HERE" button 800 on the mobile device 600, the mobile device 600 checks distance to all available beacons 520. If no nearby beacon 520 is detected, an error message 810 "No Beacon" is displayed on the device screen to allow the caregiver to take corrective action. For example, the child sensing element might be malfunctioning, or the child might be shifted in position so that the child is not detected by the pressure sensor.

Once a nearby beacon 520 is detected, indicating that a child is present, a success notification 820 "Beacon Detected" will be displayed on the device, and information regarding current time, mobile device identification, and location (e.g., global position when available) are sent 830 to the server. In case of communication errors, such as when the server is busy, or when an Internet connection is temporary not available, all data will be saved and retransmitted at a later time. All backlogged data will be saved on the mobile device, and later sent to the remote server when server access is restored.

The device of the invention can advantageously work in any location where the presence of a baby can be detected by a weight-activated pressure sensor. A smaller sensor is sufficient when a baby is strapped into a specific predetermined location, such as a car seat or a stroller. A larger pressure sensor, covering the general area where a baby can be present, is required for a playpen or a crib. A specially designed water resistant sensor and electronics are required for use in a bath tub or other wet locations.

Figure 9:
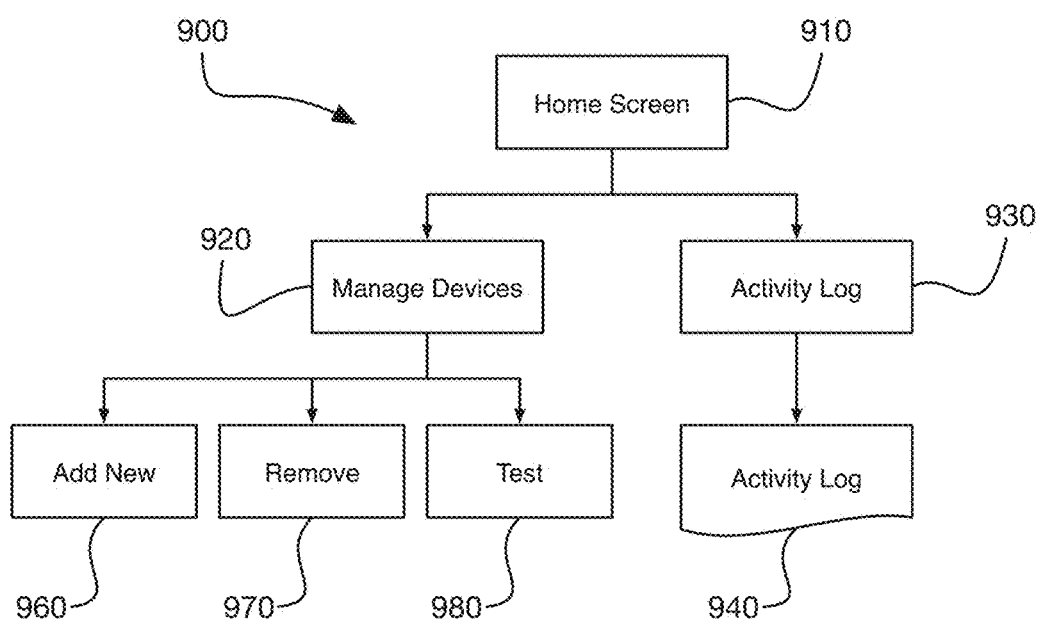
FIG. 9 is a screen flow diagram of the mobile app screen structure.

FIG. 9 is a screen flow diagram detailing one preferred embodiment of the mobile app 900 screen layout displayed on a smartphone 600. The Home Screen 910 is the main screen of the app 900 that provides a central location for the two main navigation options—Manage Devices 920 and Activity Log 930.

Manage Devices 920 is where all device 750 related activity is performed. Add New 960 is where you associate a new safety device 750 with the logged in account. Remove 970 is where you disassociate an existing safety device 750 from this account. Test 980 is where you test connectivity and confirm functionality of any associated safety device 750.

Activity Log 930 is where you view a full activity log 940 of all alerts for all devices 750 associated with this account.

The mobile app 900 could be a single-function app dedicated to monitoring one or more safety devices 750, or a more general multi-purpose app that performs various tasks, where monitoring a safety device 750 is just one of the functions. In a single-function mobile app 900, Main Screen 910 could indeed be the app's main screen. In a multi-functional app 900, Main Screen 910 may refer to the main screen associated with our safety device management and operation, but it could also refer to the multi-functional app's main screen that would include the two safety device related options Manage Devices 920 and Activity Log 930.

Figure 10:
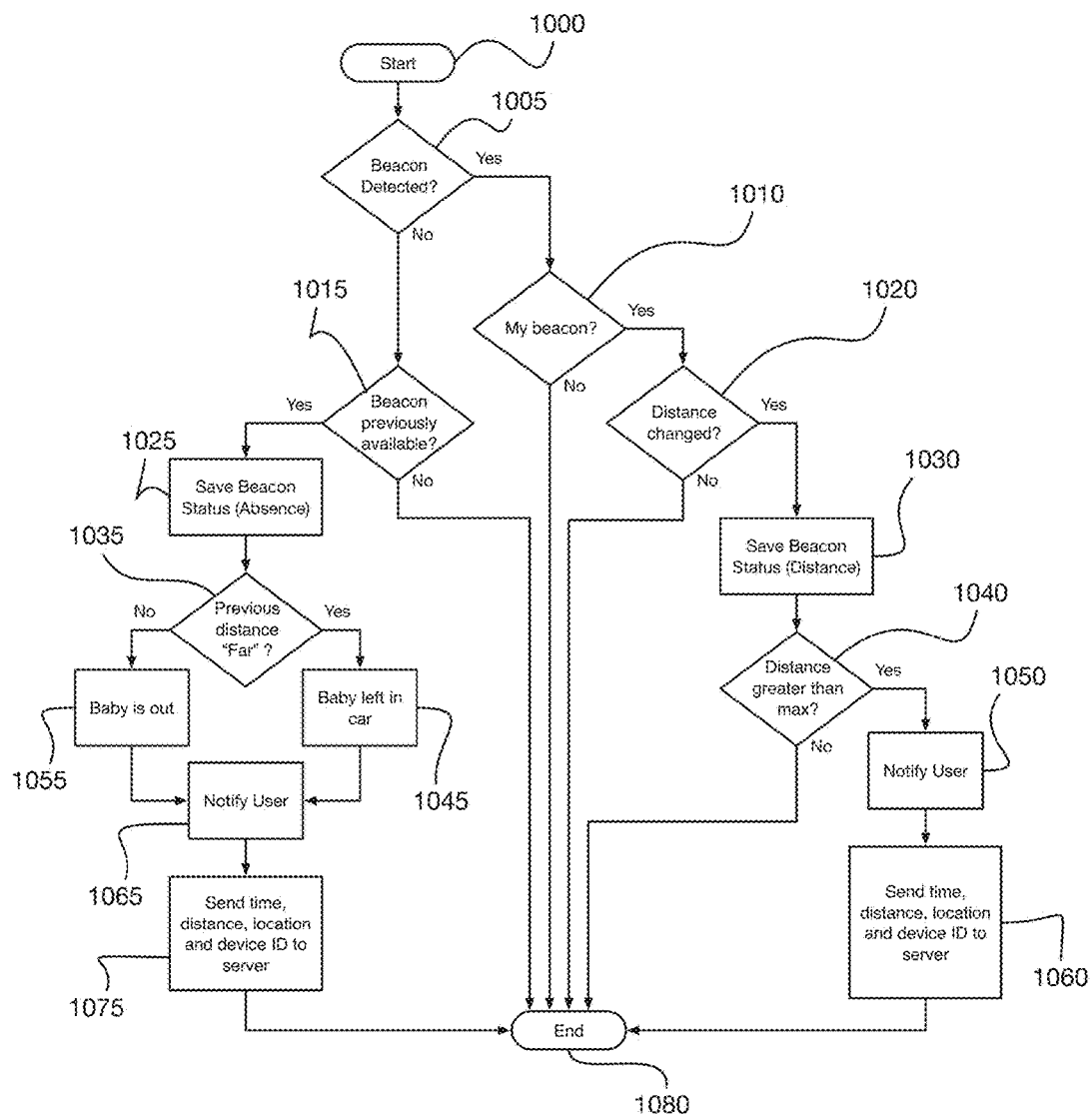
FIG. 10 is a flowchart showing the mobile app process that handles beacon notifications and the logic that determines when to issue an alert.

FIG. 10 is a flowchart diagram for the decision making process that needs to be implemented in the mobile app 900. For clarity and ease of understanding, this process is described as a one-time process loop starting at Start 1000 and ending at End 1080. In the actual application, this should be implemented as a continuous endless loop, so that as soon as the process reaches End 1080, it starts again at Start 1000. Some mobile operating systems provide an even driven alternative to the endless loop. If supported by the operating system and the mobile device hardware, it is advisable to eliminate the continuous endless loop 1000-1080, and only execute the process 1000-1080 when a change occurs in the way a beacon is sensed. The event driven execution, when applicable, is more efficient.

When a change in beacon status occurs, or when a continuous endless loop starts, it is important to identify Beacon Detected 1005 status.

If Beacon Detected 1005 status is "Yes", and the detected beacon is My beacon 1010, as identified by the standard beacon UUID, then we check if the distance to the beacon changed 1020 as compared to the previously saved distance 1030.

If either there is no change in distance 1020, or the distance is not greater than a predetermined max 1040, then the process ends 1080. If the new distance is greater than the predetermined max 1040, then the user is notified 1050 and alert information is sent to the server 720. Such alert information may include one or more of time, distance, location coordinates, beacon UUID, mobile device ID, etc.

If Beacon Detected 1005 status is "No" then it is important to check if a beacon was previously available 1015 the last time this process was executed 1030. If no beacon was available from 1030, then this execution loop may end 1080. If saved beacon status from 1030 is available from a previous run of the execution loop, then it is important to update the last status 1030 as "Beacon is absent" 1025. The next decision depends on the last distance saved 1030 as it was before it was marked as "absent".

If the previous distance 1035 was less than far, then the baby was taken out of the safety device 1055. If the previous distance 1035 was far, then we interpret it as if the baby was let in the car. In either case, we notify the user 1065, and send appropriate information to the server 1075.

All communications with our server 720 are utilizing standard TCP/IP protocols, over standard Internet connectivity of the mobile device 600. No communications to the server 720 are possible if the mobile device 600 has no internet connectivity.

Figure 11:
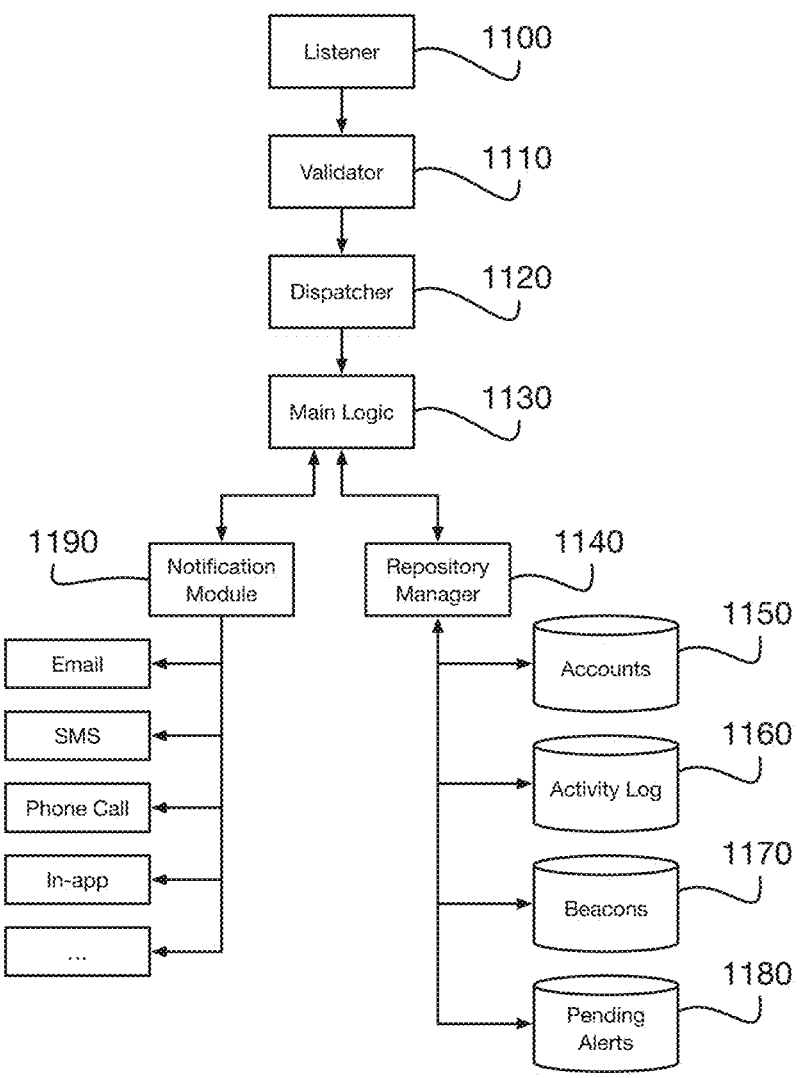
FIG. 11 is a schematic data flow diagram of the server software architecture and main functional blocks.

FIG. 11 describes our server software architecture and main functional blocks. Listener 1100 is a standard web server component, listening to a publically available TCP/IP port. Any traffic received by the Listener 1100 is forwarded to a Validator 1110 that is responsible to validate received data. Only valid data packets are forwarded to Dispatcher 1120 that delivers the data packets to the main logic module 1130 for processing. Main logic module 1130 utilizes Repository Manager 1140 to store all activity in Activity Log 1160.

Main logic 1130 utilizes Repository Manager 1140 to retrieve Account 1150 and beacon 1170 information, and determines whether an alert should be issued and who should receive such alert. All alerts are then stored in Pending Alerts 1180 for delivery by the Notification Module 1190.

Notification Module 1190 delivers Pending Alerts 1180 in the order they have been created, using any means approved by the users, selected from one or more of email, SMS, phone call, and In-app messages, for example.

Other modifications and implementations will occur to those skilled in the art without departing from the spirit and the scope of the invention as claimed. Accordingly, the above description is not intended to limit the invention, except as indicated in the following claims.

What is claimed is:

1. A system for alerting a caregiver of a child that the child has been unintentionally or recklessly abandoned, with the intention of preventing harm to the child, the system comprising:
   a child presence detecting device having a Bluetooth Low Energy beacon, the child presence detecting device being configured to transmit a signal using the Bluetooth Low Energy beacon only when a child is detected as being present in a location;
   a central server; and
   a local mobile device configured to receive and interpret the signal provided by the Bluetooth Low Energy beacon of the child presence detecting device, and configured to generate a local alert when a signal strength of the signal becomes lower than a threshold, the local alert being for alerting a caregiver carrying the local mobile device that the child has been unintentionally or recklessly abandoned, the local mobile device also being configured to send a remote alert via an internet connection to the central server, the central server being configured to communicate the remote alert to at least one remote mobile device via a respective individual internet connection,
   wherein multiple local mobile devices are configured to continuously monitor their own distance to a respective child presence detecting device, each local mobile device being configured to use an individual Internet connection to relay a respective remote alert via the central server that is configured to communicate with at least one remote mobile device via a respective individual internet connection.

2. The device of claim 1, wherein the local alert includes: time, proximity, location, and device ID.

3. The system of claim 1, further comprising:
   a second local mobile device configured to interpret the signal provided by the Bluetooth Low Energy beacon, and configured to generate a second local alert when a signal strength of the signal becomes lower than a threshold, the second local alert being for alerting at least a second caregiver carrying the second local mobile device that the child has been unintentionally or recklessly abandoned.

4. The system of claim 1, wherein the local mobile device is configured to receive and interpret a plurality of signals provided by a respective plurality of Bluetooth Low Energy beacons, and is configured to generate a respective local alert whenever a signal strength of one of the signals becomes lower than a threshold.

5. The system of claim 1, wherein the local mobile device is one of: a smart phone, a tablet computer, a notebook computer, a laptop computer.

6. The system of claim 1, wherein the child presence detecting device further includes:
   at least one pressure sensor configured to detect the presence of a child in the location, the pressure sensor functioning as an open switch when no detectable pressure is applied to the pressure sensor; and
   a battery electrically connected to both the Bluetooth Low Energy beacon and the at least one pressure sensor, thereby energizing the Bluetooth Low Energy beacon when detectable pressure is applied to the pressure sensor, and deactivating the Bluetooth Low Energy beacon when no detectable pressure is applied to the pressure sensor.

7. The system of claim 1, wherein the local mobile device that is configured to receive and interpret the signal provided by the Bluetooth Low Energy beacon is also configured to generate a remote alert, the central server being configured to communicate the remote alert to at least one remote mobile device via a respective individual internet connection, a remote alert being generated when any of the following events occur:
   a child has been placed or strapped into a monitored location having a child presence detecting device;
   the distance between a local mobile device and a child presence detecting device has exceeded a preset threshold distance;
   a local mobile device has lost communication with a previously detected child presence detecting device due to physically moving away from the child presence detecting device;
   child presence is no longer detected by a child presence detecting device, indicating that either the child presence detecting device has malfunctioned, or the child was taken out of a monitored location having the child presence detecting device.

8. The device of claim 1, wherein the central server is configured to:
   periodically ping each local mobile device that is in local relationship with a child presence detecting device that is actively detecting presence of a child; and
   send a remote alert to at least one remote mobile device whenever a child presence detecting device is turned off while monitoring a child.

* * * * *